US006628622B1

United States Patent
Bulick et al.

(10) Patent No.: US 6,628,622 B1
(45) Date of Patent: Sep. 30, 2003

(54) SS7 NETWORK PLANNING TOOL

(75) Inventors: Stephen L. Bulick, Boulder, CO (US); Victoria L. C. Okeson, Arvada, CO (US); Pierre L. Bastien, Castle Rock, CO (US); Xiaojiang Lu, Broomfield, CO (US); Steve E. Showell, Parker, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/156,282

(22) Filed: Sep. 17, 1998

(51) Int. Cl.[7] .............................................. H04L 12/28
(52) U.S. Cl. ...................... 370/254; 370/385; 370/386; 370/400; 379/221.05
(58) Field of Search ...................... 379/221.05, 221.06, 379/15.02, 15.04, 32.03, 114.29, 221.1, 221.08, 221.09; 370/385–386, 254, 400, 410, 229, 236, 384, 496, 522

(56) References Cited

U.S. PATENT DOCUMENTS

| | | | |
|---|---|---|---|
| 5,999,808 A | * 12/1999 | LaDue | 455/412 |
| 6,195,425 B1 | * 2/2001 | Farris | 379/230 |
| 6,246,405 B1 | * 6/2001 | Johnson | 345/764 |
| 6,282,267 B1 | * 8/2001 | Nolting | 379/32.03 |
| 6,314,172 B1 | * 11/2001 | Nightingale | 379/201 |

\* cited by examiner

*Primary Examiner*—Dang Ton
*Assistant Examiner*—Inder Pal Mehra
(74) *Attorney, Agent, or Firm*—Townsend and Townsend and Crew LLP (57) ABSTRACT

Planning alternative SS7 networks is a complex task requiring assistance from an intelligent planning tool. The tool includes at least one planning database containing information on network traffic, component locations, and component connectivity. A load module determines peak load for each STP in the core network. A forecast module determines equipment capacity exhaustion for each STP, network database, and core link during each study period and determines network costs based on peak loads and an alternative network design provided by a user. A graphical user interface guides the user through a sequence of design steps, each step having to be correctly completed before the next step in the sequence is started. The sequence of steps may include permitting changes to the core network, permitting changes to the number of POPs and DBs, rehoming elements left disconnected from STPs, assigning SSPs to POPs, assigning SSPs to DBs, and permitting voluntary rehomes.

12 Claims, 7 Drawing Sheets

SS7 NETWORK PLANNING TOOL

TECHNICAL FIELD

This invention relates to tools for planning Signaling System 7 (SS7) communication networks.

BACKGROUND ART

An SS7 network is a packet data network used for out-of-band signaling to perform call set-up and tear-down, to implement Advanced Intelligent Network (AIN) services, to route traffic to interexchange carriers (IXCs), and to access database information needed to provide certain services such as 800, LNP, and LIDB. Core components of the SS7 network include switches called Signal Transfer Points (STPs). The STPs are interconnected with data links to form a core network.

Connected to each STP may be several different network elements. Signal Switching Points (SSPs or central offices) route calls. Points-of-Presence (POPs) serve as sources and sinks for network traffic. POPs provide alternate local carriers and IXCs with access to the Local Access and Transport Area (LATA) serviced by the STP. Network databases (DBs) support customer services.

Designing an alternative network includes adding, deleting, and moving network components, changing component capabilities, adding and modifying network services, and modifying connectivity between components. Changes to an existing network can create unintended situations. Removing an STP can leave elements disconnected from the network. Removing a database can eliminate a required service. Modifying connectivity can create load in excess of capacity on certain links and network components. Designs are further complicated by changing loads and service requirements over time.

Traditionally, SS7 network planning has been accomplished through the use of spreadsheets. These spreadsheets only model a portion of the network such as, for example, the core network. Another difficulty is that load information has to be manually entered. Further, graphical display of the network and the effects of modifying the network are limited. As network size and complexity increases, the number of variables used to model the network is increasing beyond the capacity of the spreadsheet. Finally, a user attempting to create an alternative network does not have sufficient guidance and correctness validation.

What is needed is an SS7 network modeling tool that provides greater capabilities. The tool should guide a user through the development of an alternative network design. A graphical user interface should provide the user with an image of the network and allow the user to graphically select network components for modification. The tool should determine equipment capacity exhaustion due to maximum loads forecast for each study period and the costs for alternative networks.

SUMMARY OF THE INVENTION

It is a primary object of the present invention to provide an SS7 network modeling tool with greater capabilities than existing tools.

Another object of the present invention is to guide the user through the development of an alternative network design.

Still another object of the present invention is to provide a graphical user interface showing the user with an image of the network and allowing the user to graphically select network components for modification.

A further object of the present invention is to determine equipment capacity exhaustion due to maximum loads forecast for each study period.

A still further object of the present invention is to determine costs for alternative networks.

In carrying out the above objects and other objects and features of the present invention, a system is provided for planning a Signaling System 7 (SS7) network over a sequence of study periods. The system includes at least one planning database containing information on network traffic, network component locations, and network component connectivity. A load module determines peak loads for each STP in the core network based on network traffic, component locations, and component connectivity, and stores the peak loads in the planning database. A forecast module determines equipment capacity exhaustion for each STP, network DB, and core network link during each study period and determines network costs based on peak loads and an alternative network design provided by a user. A graphical user interface guides the user through a sequence of designing steps, each step having to be correctly completed before the next step in the sequence is started.

In one embodiment, the sequence of steps through which the graphical user interface guides the user includes permitting changes to the core network, permitting changes to the number of POPs and DBs, rehoming elements left unconnected to STPs, assigning SSPs to POPs, assigning SSPs to DBs, and permitting voluntary rehomes.

In another embodiment, the graphical user interface shows graphical representations of the network on a display and allows the user to modify the network by selecting displayed graphical representations of network components.

A method is also provided including obtaining network traffic information from the network, determining current peak loads for each STP based on the network traffic information, and specifying an alternative network through a sequence of designing steps, each step having to be correctly completed before the next step in the sequence can be started. For each study period, the method includes forecasting peak loads for each STP based on the current peak loads for each STP, determining equipment capacity exhaustion for each STP, network DB, and core network link in the alternative network based on the forecasted peak loads, and determining costs for the alternative network.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
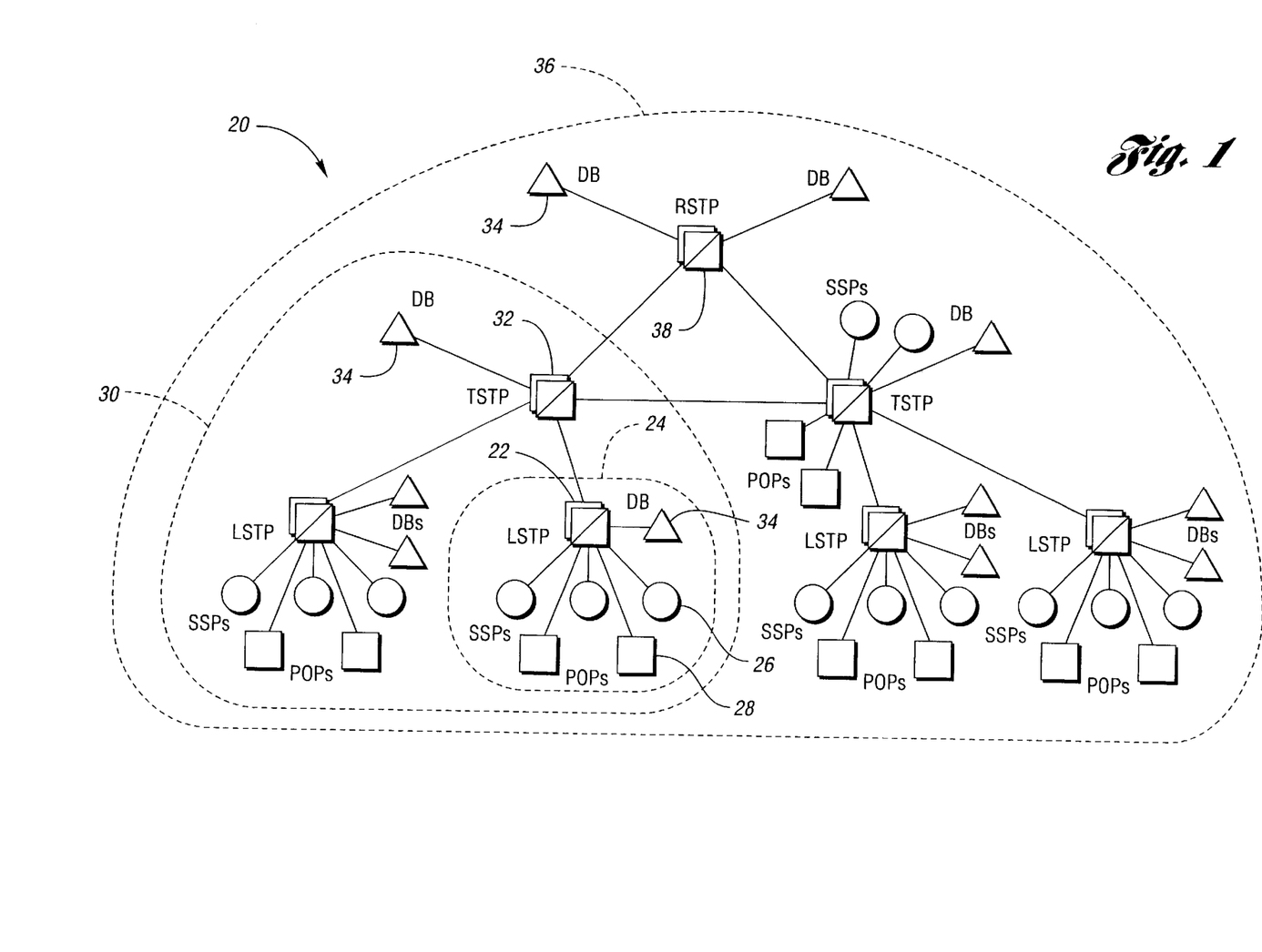
FIG. 1 is a block diagram of an SS7 network architecture that may be planned by the present invention.

Referring now to FIG. 1, an SS7 network architecture is shown. An SS7 network, shown generally by 20, is comprised of STPs interconnected by links to form a core network. Several different switch models may be used as STPs. Each model has different capacity and engineering parameters. Network 20 shown in FIG. 1 has STPs arranged in three tiers, but the present invention applies to any SS7 network configuration.

Local STP (LSTP) 22 serves a LATA, shown generally by 24. Every SSP 26 in LATA 24 is connected either directly or indirectly to LSTP 22. Connections between SSPs have been omitted for clarity.

Each LSTP 22 handles inter-LATA traffic to and from the IXCs via POPs, one of which is indicated by 28, attached to each LSTP 22. POPs 28 provide long distance services to regional Bell operating companies (RBOCs), which would otherwise be prohibited from transporting calls across the boundaries of LATA 24. POP services include AT&T®, MCI®, Sprint®, and the like. Each SSP is required to have access to each POP service. Connection between POPs is not shown for clarity.

Each LSTP may also service one or more network DBs, one of which is shown as 34. Generally, network DBs are either Service Control Points (SCPS) or Intelligent SCPs (ISCPs). Network DB services include Local Number Portability (LNP), Advanced Intelligent Network (AIN), 800 number translation, Custom Local Area Signaling Service (CLASS$^{SM}$), Line Information Data Base (LIDB), and the like. Each SSP may be required to have access to a particular network DB.

Each LATA 24 belongs to a region, one of which is indicated by 30. For the three-tiered network shown in FIG. 1, each LATA 24 within region 30 may be connected to one or more territorial STP (TSTP) 32. TSTP 32 may also service SSPs 26 and POPs 28 within a LATA 24. Each TSTP 32 in region 36 is connected to regional STP (RSTP) 38. For convenience, any STP will be referenced as 22.

Figure 2:
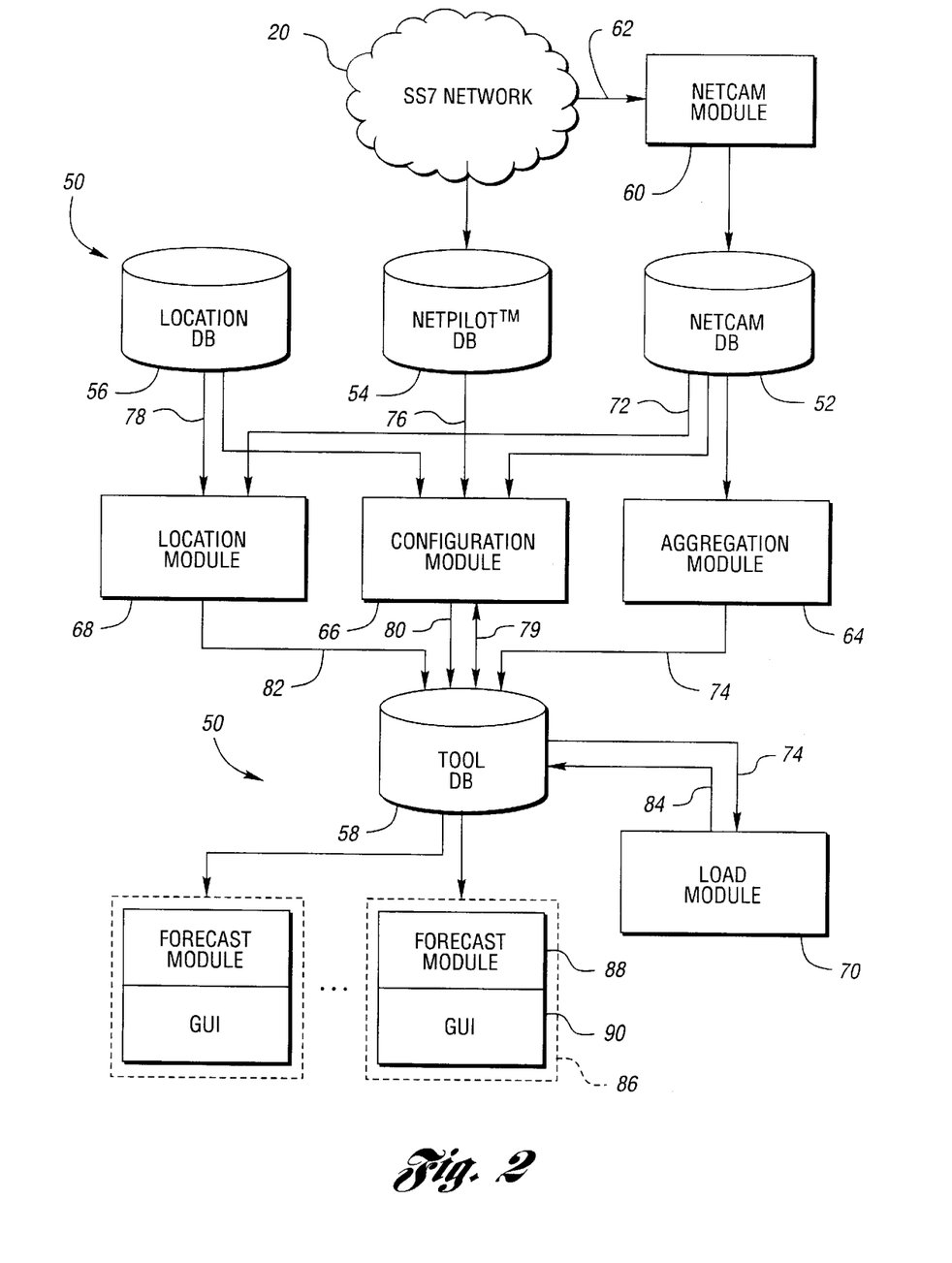
FIG. 2 is a block diagram of an exemplary system according to the present invention.

Referring now to FIG. 2, a block diagram of an exemplary system according to the present invention is shown. An alternative to network 20 is planned to be operated over a sequence of study periods. The configuration and loading of the alternative network is based on current conditions for network 20. Current conditions for network 20 are stored in a planning database, shown generally by 50. In the embodiment shown, planning database 50 is implemented as NETCAM database 52, NetPilot™ database 54, location database 56, and tool database 58. In a preferred embodiment, planning database 50 is implemented using at least one relational database, such as ORACLE from Oracle Corporation.

NETCAM database 52 includes traffic numbers, traffic averages, and outages for network 20. This data is collected in near real-time from network 20 by NETCAM module 60. NETCAM is a program originally developed by US West, Inc. and Ericsson, Ltd. NETCAM pull 62 is a set of data describing network 20 over a period, such as a half hour. NETCAM module 60 periodically accesses network 20 to obtain NETCAM pull 62 and stores the data in NETCAM database 52. Specific data may include total message signaling units (MSUs) for each STP, global title translation (GTT) counts by translation type of each STP 22, octet loads on core network links, octet loads on SSP A-links, and octet loads on POP links.

NetPilot™ database 54 includes information on network component connectivity. NETPilot™ from Bell Communication Research is a program to manage signaling system resources. The data in NetPilot™ database 54 describes the core network connectivity between STPs 22 and network elements connected to each STP 22. The data in NetPilot™ database 54 may be entered manually without using NETPILOT™.

Location database 56 includes the location of each component in network 20 together with demographic information. In a preferred embodiment, component geographic location is specified using V and H coordinates as is well known in the telecommunication art. Information includes metropolitan service area (MSA) for each SSP 26, LATA codes for each SSP 26, North American Numbering Plan (NANP) data, and NXX (local exchange) data.

Tool database 58 holds data directly accessible by the user as described below. Tool database 58 also holds a location identifier for each combination of state, city, MSA, and LATA in which a component of network 20 appears.

The data in planning database 50 is preprocessed in four modules indicated as aggregation module 64, configuration module 66, location module 68, and load module 70. Aggregation module 64 reads raw NETCAM data 72 from NETCAM database 52 collected over a period of time, typically seven days, and condenses the data. This condensed data is stored as aggregated NETCAM data 74 in tool database 58.

Configuration module 66 accepts raw NETCAM data 72 from NETCAM database 52, raw network element data 76 from NetPilot™ database 54, location data 78 from location database 56, and location identifiers 79 from tool database 58. Configuration module 66 can generate a new location identifier 79 for a component of network 20 located in a combination of state, city, LATA, and MSA not previously required. The new location identifier 7 is stored in tool database 58. Configuration module 66 also develops current network configuration data 80 which is stored in tool database 58.

Location module 68 accepts location data 78 from location database 56 and organizes location data 78 into a usable form, producing formatted location data 82 which is stored in tool database 58.

Load module 7 uses aggregated NETCAM data 74 from tool database 58 to produce peak hours data 84, which is stored back in tool database 58. In order to reduce the complexity of calculations and decrease calculation time, only peak loads for each STP 22 are used in planning calculations. These peak loads occur during the busiest one hour over a seven day period.

Many users may utilize the present invention concurrently. Computer system 86 provides an interface between a user and the present invention. As such, computer system 86 includes a display and a keyboard, pointing device, or other data entry and selection tool as is known in the art. In a preferred embodiment, each user has computer system 86 running forecast module 88 and graphical user interface (GUI) 90. Computer system 86 may be a workstation such as, for example, a Sun SPARCSTATION, or a personal computer such as, for example, an Apple MACINTOSH. Alternatively, one or both of forecast module 88 and GUI 90 may run on a central computer and computer system 86 may function as a terminal. The precise hardware used to implement computer system 86 is not critical to the present invention as will be recognized by one of ordinary skill in the art. Descriptions of forecast module 88 and GUI 90 are provided with regards to FIGS. 3 through 7 below.

Figure 3:
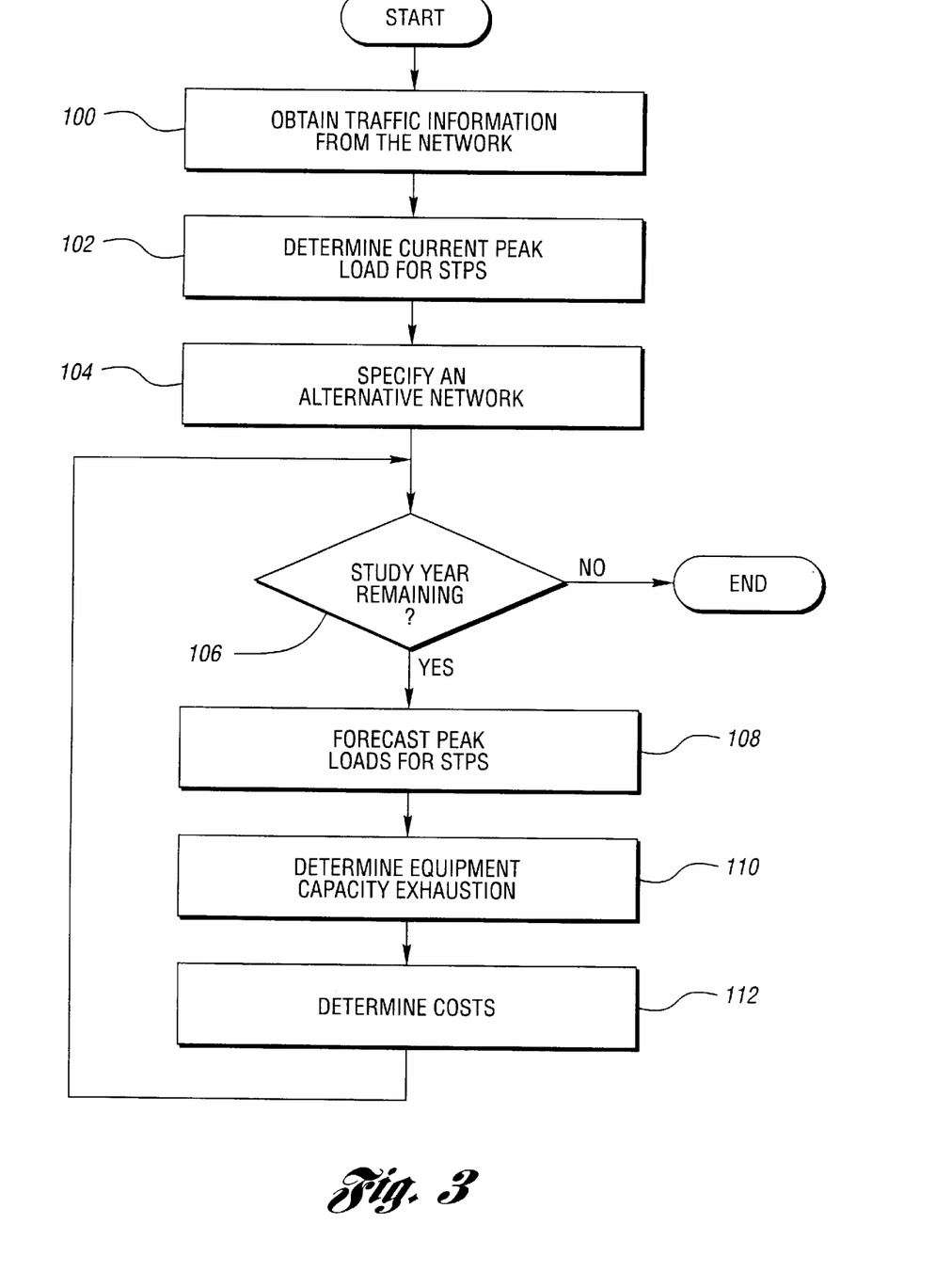
FIG. 3 is a flow diagram of an embodiment of the present invention describing a method for planning an alternative network.
Figure 4:
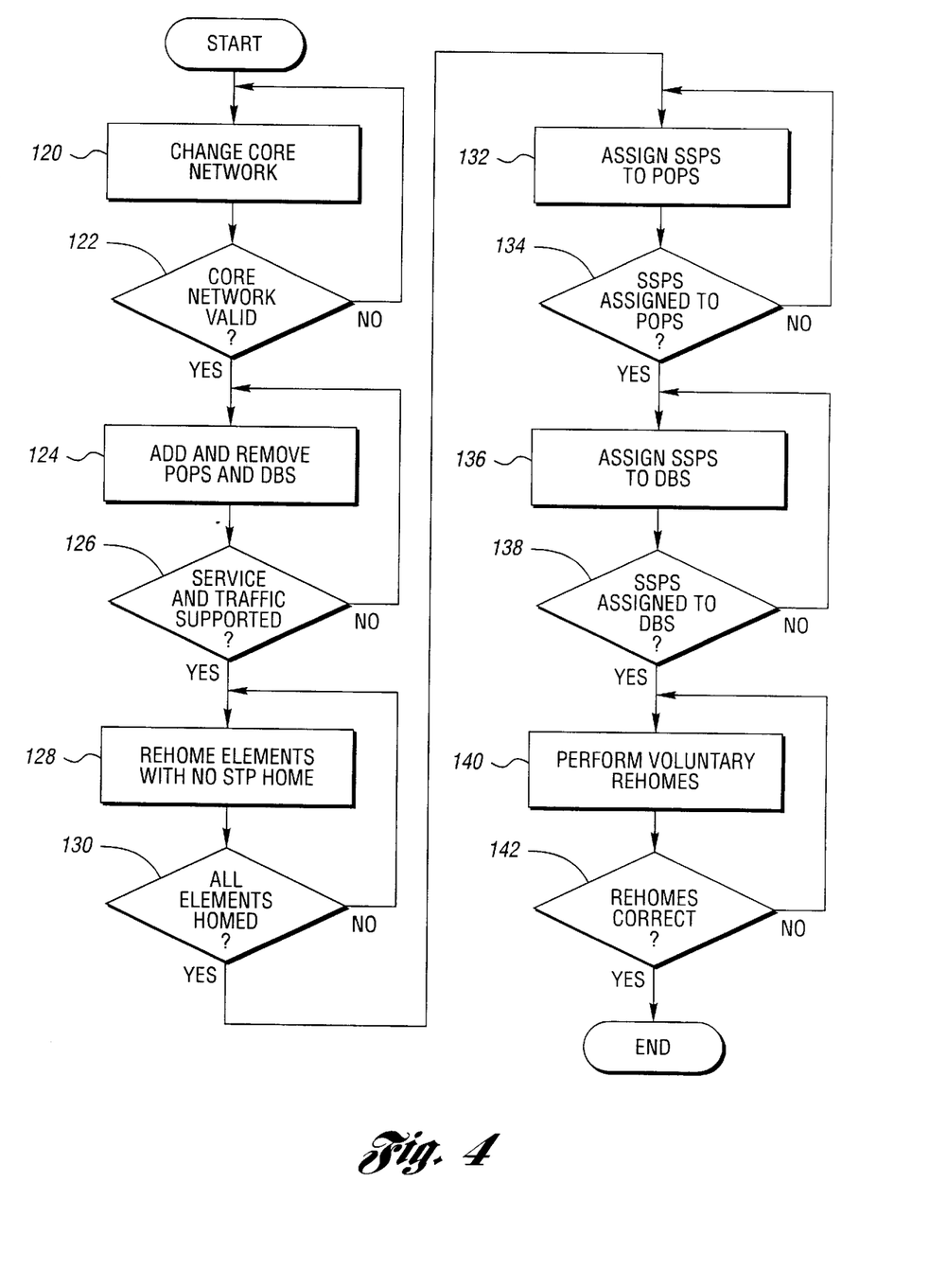
FIG. 4 is a flow diagram of steps for creating an alternative network design according to the present invention.

FIGS. 3 and 4 show flow diagrams illustrating operation of embodiments of the present invention. As will be appreciated by one of ordinary skill in the art, the operations illustrated in are not necessarily sequential operations. Similarly, operations may be performed by software, hardware, or a combination of both. The present invention transcends any particular implementation and aspects are shown in sequential flow chart form for ease of illustration.

Referring now to FIG. 3, a flow diagram of an embodiment of the present invention is shown. The flow diagram describes a method for planning an SS7 network over a sequence of study periods.

Network traffic information is obtained in block 100. NETCAM module 60 automatically obtains NETCAM pull 62 containing information about network 20 on a periodic basis. The traffic information is aggregated to show loads for each STP 22 for each hour in a seven day period and is stored in planning database 50.

Current peak loads for each STP are determined in block 102. It is possible to perform planning using all of the hourly load information obtained in block 100. However, this would be computationally expensive and does not greatly increase the accuracy of planning calculations. Therefore, the hour producing peak loads and the corresponding load values for each STP 22 are extracted and used in planning calculations.

An alternative network is specified. The goal of planning is to determine the effects that modifying network 20 may have on current and future network performance. The alternative network configuration is created by modifying the design of existing network 20. Due to the complexity of network 20 and the close interaction of network components, great care must be taken when modifying the design of network 20. The present invention guides the user through a sequence of planning steps, each step having to be correctly completed before the next step in the sequence can be started. A preferred sequence of planning steps is described with regards to FIG. 4 below.

To assist in creating the alternative network and in interpreting the results of planning simulation, GUI 90 displays graphical representations of the network on a display and allows the user to modify the network by selecting displayed graphical representations of network components. Examples of graphical displays are described with regards to FIGS. 5 through 7 below.

As part of specifying the alternative network, the user may enter the number of study periods desired. A check is made to see if any study periods remain in block 106. If not, simulation is complete.

Peak loads for STPs are forecast in block 108. For each study period, the peak loads for each STP 22 are determined based on current STP loads, network connectivity, changes to services provided, and predicted demand for services. For each STP 22, loads expressed in calls per second are calculated by peak hour, by service, by study period, and by base year STP pair. Loads for each SSP 26 are found by calculating a scale factor based on the A-link octet traffic from SSP 26 to corresponding STP 22, then multiplying the base year STP pair load by the scale factor. Loads are determined for services such as plain old telephone service (POTS) local, POTS ATT®, POTS MCI®, POTS Sprint®, CLASS$^{SM}$, 800, LIDB, CND, AIN0.0, AIN0.1, LNP, and the like.

Equipment capacity exhaustion is determined in block 110. The ability of network components to handle peak loads is found. If load exceeds capacity for a component, the user is notified. Maximum equipment required for each network component is also determined.

Cost is determined in block 112. Each component description includes capital costs such as purchase price and salvage value as well as expenses such as installation, removal, annual maintenance, yearly lease costs, costs per mile, and the like. The total cost of the alternative network as well as costs by component type and expense type are determined.

Peak load forecast, equipment capacity exhaustion, and cost determination are repeated until every study period has been completed.

Variations on the above method are possible within the spirit and scope of the present invention as will be recognized by one of ordinary skill in the art. For example, peak loads may be forecasted for every study period prior to determining any equipment capacity exhaustion.

Referring now to FIG. 4, a flow diagram of steps for creating an alternative network design according to the present invention is shown.

The core network may be changed in block 120. Arbitrary changes to the network of STPs 22 and interconnecting links may be made. In any study period, STPs 22 and core links may be installed or retired.

The core network is checked for validity in block 122. If any STP 22 is isolated from the remainder of alternative network 20, alternative network 20 is invalid. If alternative network 20 is invalid, block 120 is reentered, allowing the user to modify the alternative core network design.

POPs and DBs may be added and removed in block 124. POPs 28 and DBs 34 may be installed or retired in any study period. The user specifies STP 22 to which a modification will be made, the operation to be performed (add or delete), and the type of element (POP or DB). In the case of DB 34 addition, a name, model, and list of services provided are entered.

A check is made to determine if all services and traffic is supported in block 126. If the removal of DB 34 leaves network 20 without a required service or if the removal of POP 28 leaves network 20 without access to a category of IXC traffic, alternative network 20 is invalid. If alternative network 20 is invalid, block 124 is reentered, allowing the user to install the appropriate DB 34 or POP 28.

Elements with no STP home are rehomed in block 128. As a result of removing STP 22, some network elements including SSPs 26, POPs 28, and DBs 34 may be left without a home STP 22. If any disconnected elements exist, the user is prompted to select a new home STP 22 for each network element.

A check is made to determine if all network elements are homed in block 130. If any network element is not homed to one of STP 22, alternative network 20 is invalid. If alternative network 20 is invalid, block 128 is reentered, allowing the user to rehome network elements.

SSPs are assigned to POPs in block 132. If POP 28 is retired, SSP 26 which was previously assigned to POP 28 no longer has access to the IXC traffic provided by POP 28. Each such SSP 26 must be assigned to POP 28 connected to alternative network 20 providing the required IXC access.

A check is made to determine if all SSPs are assigned to POPs in block 134. If any SSP 26 is not assigned to POP 28 for each IXC access provider, alternative network 20 is invalid. If alternative network 20 is invalid, block 132 is reentered, allowing the user to reassign SSP 26 to an appropriate POP 28.

SSPs are assigned to DBs in block 136. If DB 34 is retired or supports a new service, SSP 26 may not have access to the service supplied by DB 34. Each such SSP 26 must be assigned to DB 34 connected to alternative network 20 that provides the required service.

A check is made to determine if all SSPs are assigned to DBs in block 138. If any SSP 26 is not assigned to DB 34 for each required service, alternative network 20 is invalid. If alternative network 20 is invalid, block 136 is reentered, allowing the user to reassign SSP 26 to an appropriate DB 34.

Voluntary rehomes are performed in block 140. At this point, alternative network 20 is valid. However, the user may desire different STP 22 homes to SSPs 26, POPs 28, and DBs 34, and may desire different POPs 28 and DBs 34 to service SSP 26. The user selects the affected STP 22 then makes the desired changes.

A check is made to determine if all rehomes are correct in block 142. If any rehome is not correct, alternative network 20 is invalid. If alternative network 20 is invalid, block 140 is reentered, allowing the user to correct voluntary rehomes.

Figure 5:
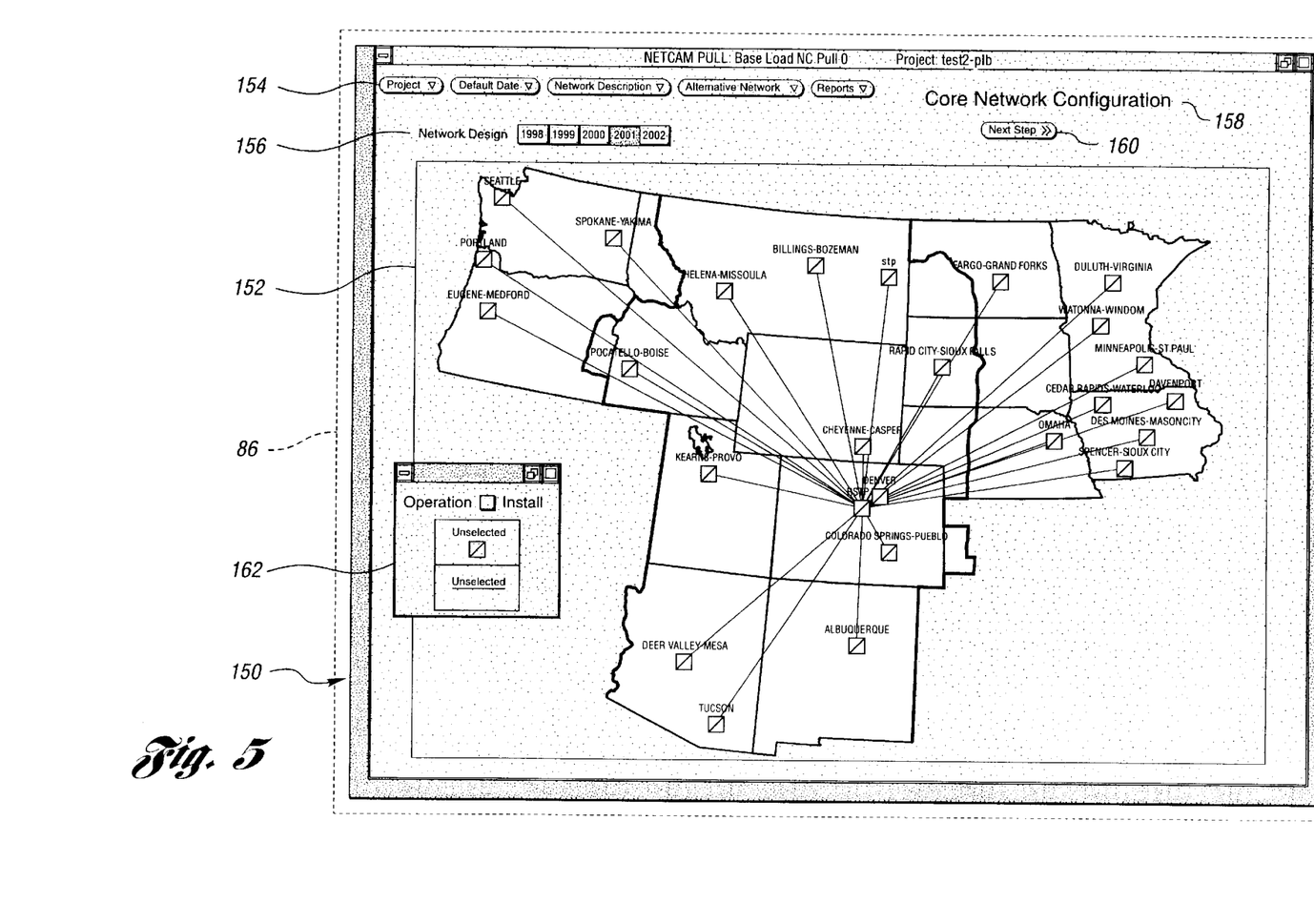
FIG. 5 is a view of a graphical user interface screen according to the present invention showing the core network.
Figure 6:
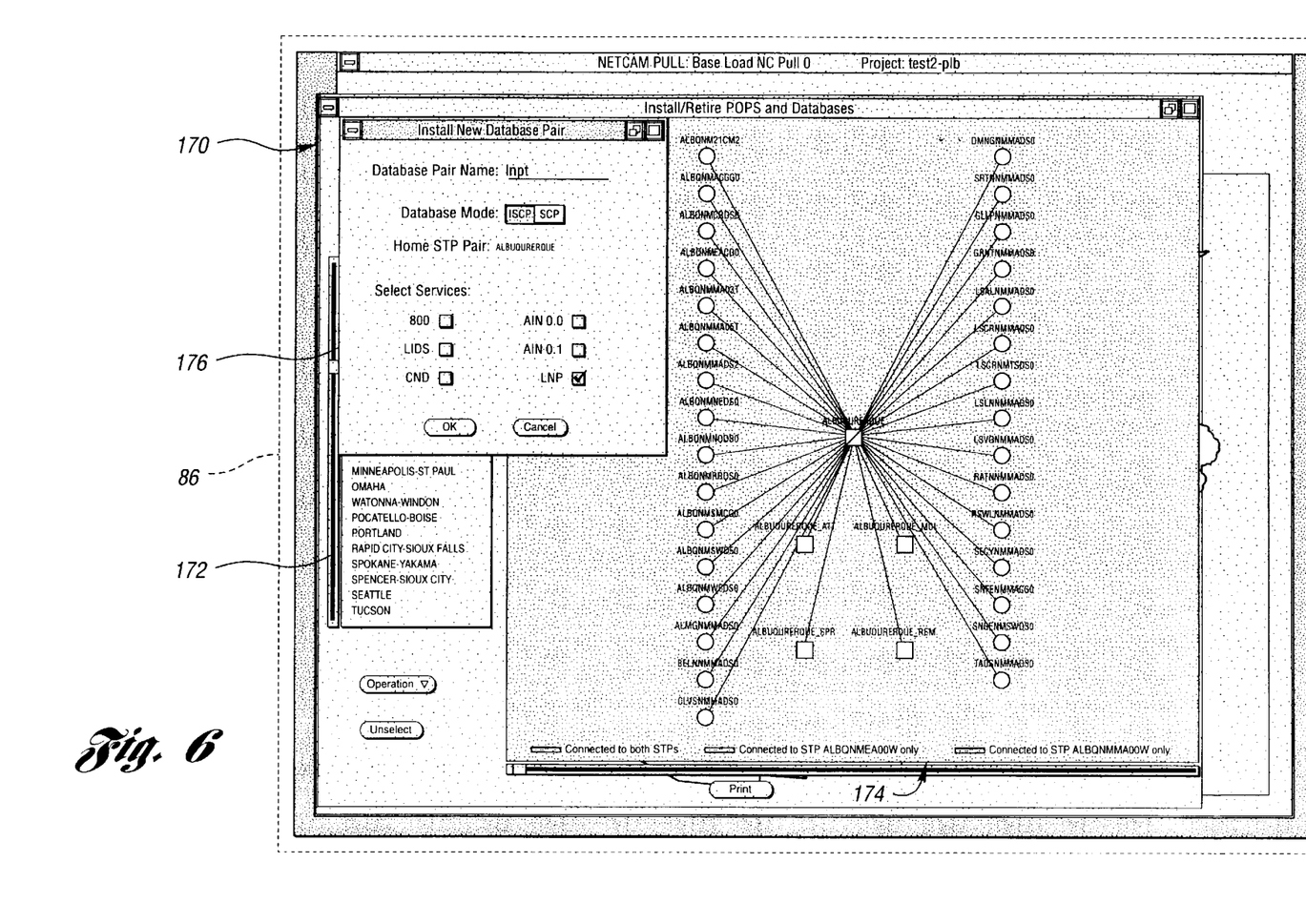
FIG. 6 is a view of a graphical user interface screen according to the present invention showing a subnet for a specific STP.
Figure 7:
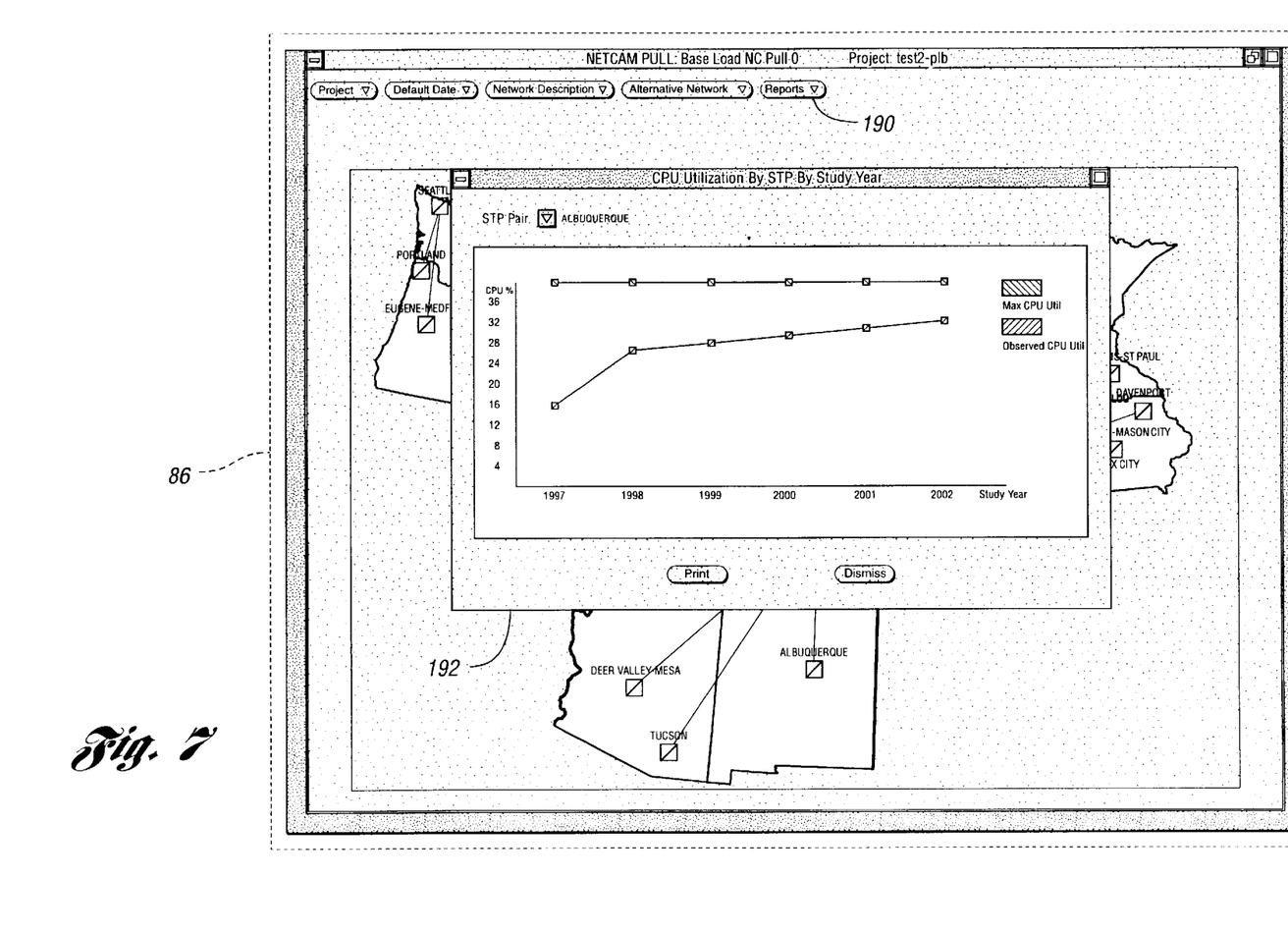
FIG. 7 is a view of a graphical user interface screen according to the present invention showing an output graph.

Referring now to FIGS. 5 through 7, views of displays from a graphical user interface according to an embodiment of the present invention are shown. The views are provided as an example of GUI output and do not represent a complete listing of screens provided.

Referring now to FIG. 5, a view of a graphical user interface screen including the core network is shown. The view appears in a window, shown generally by 150, on a display that is part of computer system 86. Subwindow 152 includes a map showing the region of interest and core network components. Menu controls 154 provide access to general commands such as load project, store project, begin alternative network design, and the like. Period select control 156 allows a study period to be specified. The view shown by 150 is of the core network configuration step, as indicated by display text 158. The user signals completion of an alternative network design step by selecting next step button 160, at which time any user modifications are checked as described with regards to FIG. 4 above. Pop-up windows, one of which is indicated by 162, allow the user to specify operations.

Referring now to FIG. 6, a view of a subnet is shown. For certain operations, viewing a subnet of network 20 is more convenient. Window 17 includes STP listing 17 for selecting STP 22. Once selected, the elements connected to STP 22 are graphically shown in window 17. In this view, POPs 28 and DBs 34 are being added and deleted. Pop-up window 176 allows data for adding DB 34 to be entered.

Referring now to FIG. 7, a view of an output graph is shown. Once simulation is complete, results may be viewed and printed. Reports button 190 allows the user to obtain various graphs and tables. One such graph is shown in pop-up window 192. Maximum and average CPU utilization is plotted as a function of study period.

Code for the present invention was written in C, PRO-C by Oracle Corporation, and AppBuilder, an graphical development environment developed at US West, Inc. As is appreciated by one of ordinary skill in the art, a variety of available software languages could be used to implement the present invention including VISUAL C++ or VISUAL BASIC, both by Microsoft Corporation.

While the best modes for carrying out the invention have been described in detail, those familiar with the art to which this invention relates will recognize various alternative designs and embodiments for practicing the invention as defined by the following claims.

What is claimed is:

1. A system for planing a Signaling System 7 (SS7) network for a sequence of study periods, the SS7 network comprising a plurality of signal transfer points (STPs) interconnected by links to form a core network, each STP having at least one element selected from the group consisting of signal switching points (SSPs), points-of-presence (POPs), and network databases (DBs), the system comprising:

at least one planing database comprising information on network traffic, network component locations, and network component connectivity;

a load module in communication with each of the at least one planning database, the load module operable to determine peak loads for each STP in the core network based on network traffic, component locations, and component connectivity and operative to store the determined peak loads in one of the at least one planning database;

a forecast module in communication with the at least one planning database, the forecast module operative to determine equipment capacity exhaustion for each STP, network DB, and core network link during each study period and to determine network costs based on determined peak loads and an alternative network design provided by a user;

a graphical user interface in communication with the forecast module and at least one of the at least one planning database, the graphical user interface operable to guide the user through a sequence of design steps, each step having to be correctly completed before the next step in the sequence can be started, thereby producing the alternative network design; and wherein the sequence of steps through which the graphical user interface guides the user comprises:
  permit changes to the core network;
  permit changes to the number of POPs and DBs;
  rehome elements left unconnected to STPs;
  assign SSPs to POPs;
  assign SSPs to DBs; and
  permit voluntary rehomes.

2. A system for planing an SS7 network as in claim 1 wherein the graphical user interface is further operable to show graphical representations of the network on a display and to allow the user to modify the network by selecting displayed graphical representations of network components.

3. A method for planning a Signaling System 7 (SS7) network for a sequence of study periods, the SS7 network comprising a plurality of signal transfer points (STPs) interconnected by links to form a core network, each STP having at least one element selected from the group consisting of signal switching points (SSPs), points-of-presence (POPs), and databases (DBs), the method comprising:

obtaining network traffic information from the network;

determining current peak loads for each STP based on the network traffic information;

specifying an alternative network through a sequence of design steps, each step having to be correctly completed before the next step in the sequence can be started;

forecasting peak loads for each STP during each study period based on the current peak loads for each STP;

determining equipment capacity exhaustion for each STP, network DB, and core network link during each study period for the alternative network based on the forecasted peak loads;

determining costs for the alternative network for each study period; and wherein specifying an alternative network comprises:
permitting changes to the core network;
permitting changes to the number of POPs and DBs;
rehoming elements left disconnected from STPs;
assigning SSPs to POPs;
assigning SSPs to DBs; and
permitting voluntary rehomes.

4. A system for planning a network, the system comprising:
a network, wherein the network comprises a plurality of signal transfer points (STPs) interconnected by links to from a core network, wherein the STPs comprise one or more elements selected from a group consisting of a signal switching point (SSP), a point-of-presence (POP), and a network database (DB);
at least one planning database comprising data about traffic on the network;
a load module in communication with the network database, wherein the load module is operable to determine peak loads for each STP in the core network based on network traffic;
a forecast module in communication with the at least one planning database, the forecast module operative to determine an equipment capacity exhaustion for each STP, and to determine network costs based on determined peak loads and an alternative network design provided by a user;
a graphical user interface in communication with the forecast module and the at least one planning database; and
a series of two or more processes through which the graphical user interface guides a user, wherein the two or more processes are selected from a group consisting of:
permit changes to the core network;
permit changes to the number of POPs and DBs;
rehome elements left unconnected to STPs;
assign SSPs to POPs;
assign SSPs to DBs; and
permit voluntary rehomes.

5. A system for planning an SS7 network as in claim 4 wherein the graphical user interface is operable to show graphical representations of the network on a display and to allow a user to modify the network by selecting displayed graphical representations of network components.

6. A method for planning a network, the network comprising a plurality of signal transfer points (STPs) interconnected by links to form a core network, each STP having at least one element selected from a group consisting of: a signal switching point (SSP), a point-of-presence (POP), and a database (DBs), the method comprising:
obtaining network traffic information from the network;
determining current peak loads for each STP based on the network traffic information;
specifying an alternative network through a group of design processes;
forecasting a peak load for each STP based on a current peak load for each STP;
determining an equipment capacity exhaustion for each STP, for the alternative network based on the forecasted peak loads; and wherein two or more of the design processes within the group of design processes must be completed in a specified order.

7. The method of claim 6, wherein each of the design processes within the group of design processes must be correctly completed before the next process in the group of design processes can be started.

8. The method of claim 6, the method further comprising:
determining a cost for the alternative network.

9. The method of claim 6, wherein the specifying an alternative network is done using a graphical user interface.

10. The method of claim 9, wherein the graphical user interface guides a user through a series of two or more processes, wherein the two or more processes are selected from a group consisting of:
permit changes to the core network;
permit changes to the number of POPs and DBs;
rehome elements left unconnected to STPs;
assign SSPs to POPs;
assign SSPs to DBs; and
permit voluntary rehomes.

11. The method of claim 9, wherein the graphical user interface guides a user through the following sequence of processes:
permit changes to the core network;
permit changes to the number of POPs and DBs;
rehome elements left unconnected to STPs;
assign SSPs to POPs;
assign SSPs to DBs; and
permit voluntary rehomes.

12. A method for planning a Signaling System 7 (SS7) network for a sequence of study periods, the SS7 network comprising a plurality of signal transfer points (STPs) interconnected by links to form a core network, each STP having at least one element selected from a group consisting of: a signal switching point (SSP), a point-of-presence (POP), and a network database (DB), the method comprising:
obtaining network traffic information from the network;
determine current peak loads for each STP based on the network traffic information;
specifying an alternative network through a sequence of design steps, wherein the sequence of design steps cores two or more of the following processes performed one after another:
permitting changes to the core network;
permitting changes to the number of POPs and DBs;
rehoming elements left disconnected from STPs;
assigning SSPs to POPs;
assigning SSPs to DBs; and
permitting voluntary rehomes;
forecasting peak loads for each STP during each study period based on the current peak loads for each STP; and
determining equipment capacity exhaustion for each STP for the alternative network based on the forecasted peak load.

* * * * *